UNITED STATES PATENT OFFICE.

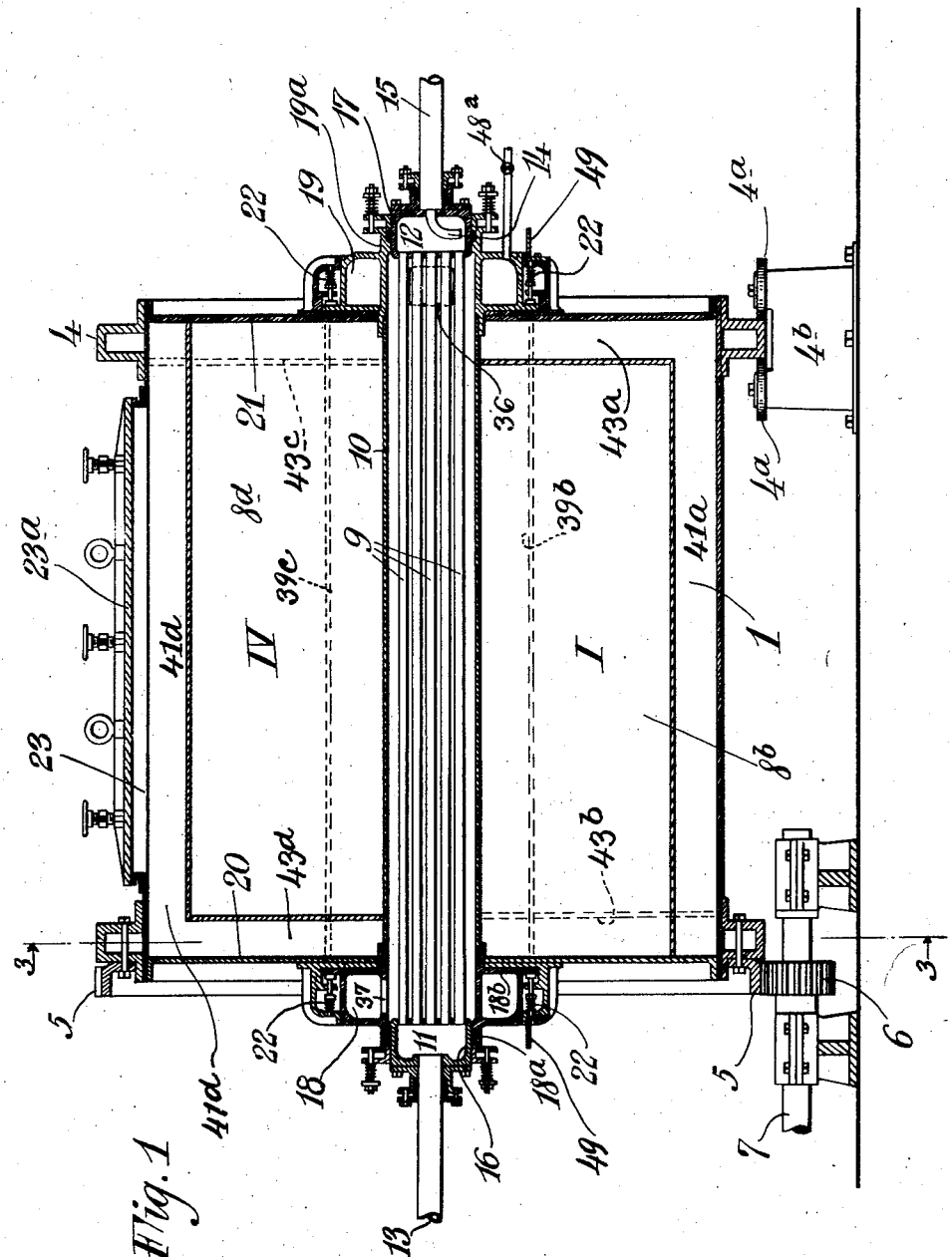

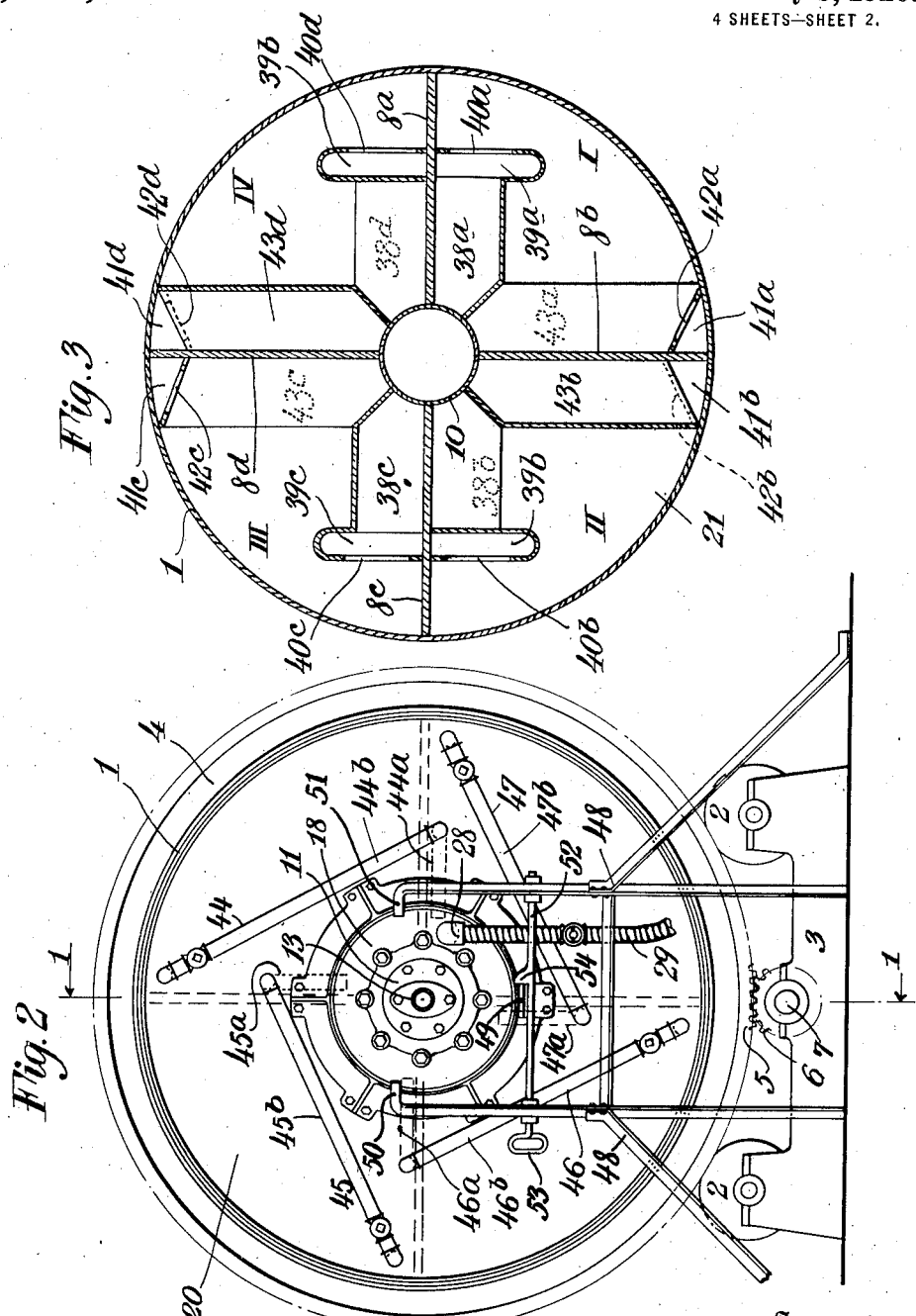

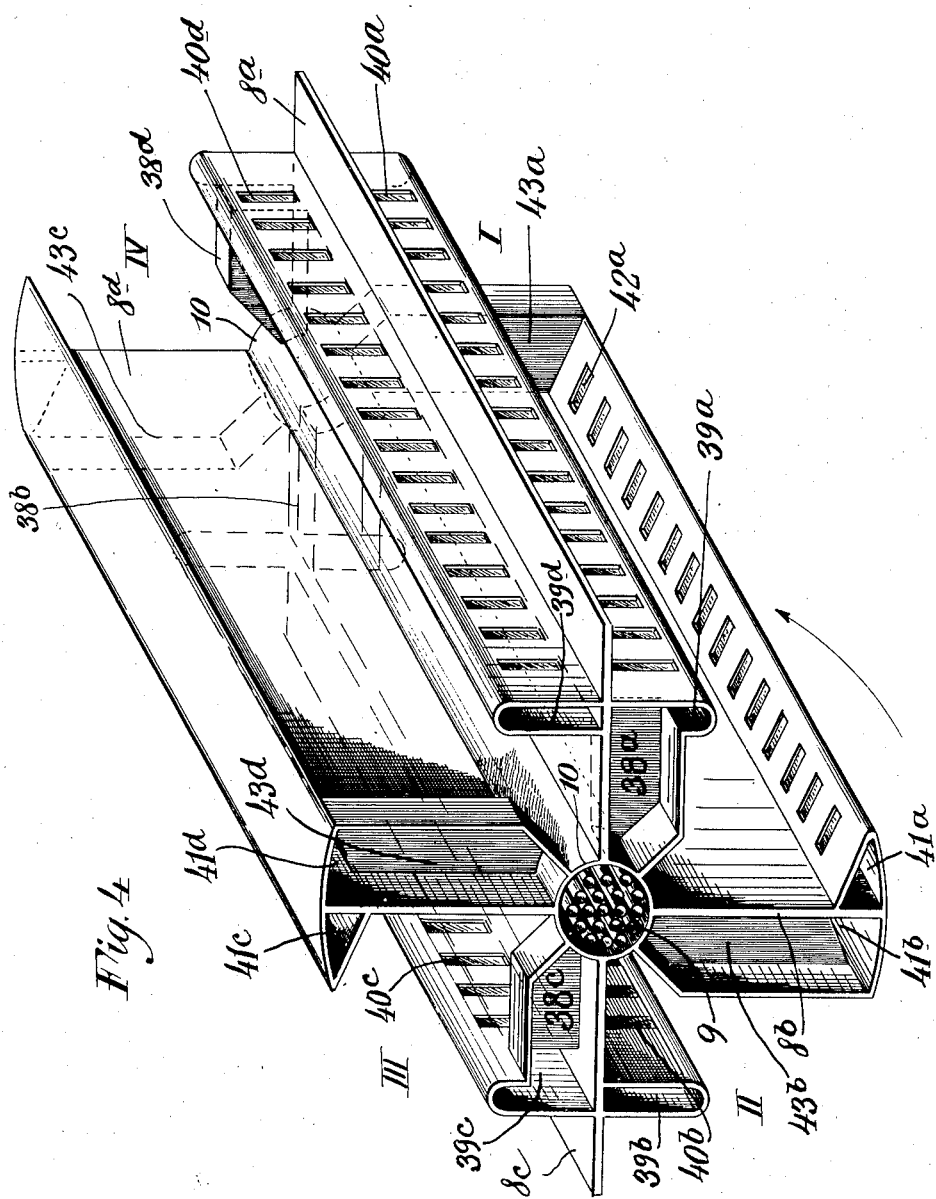

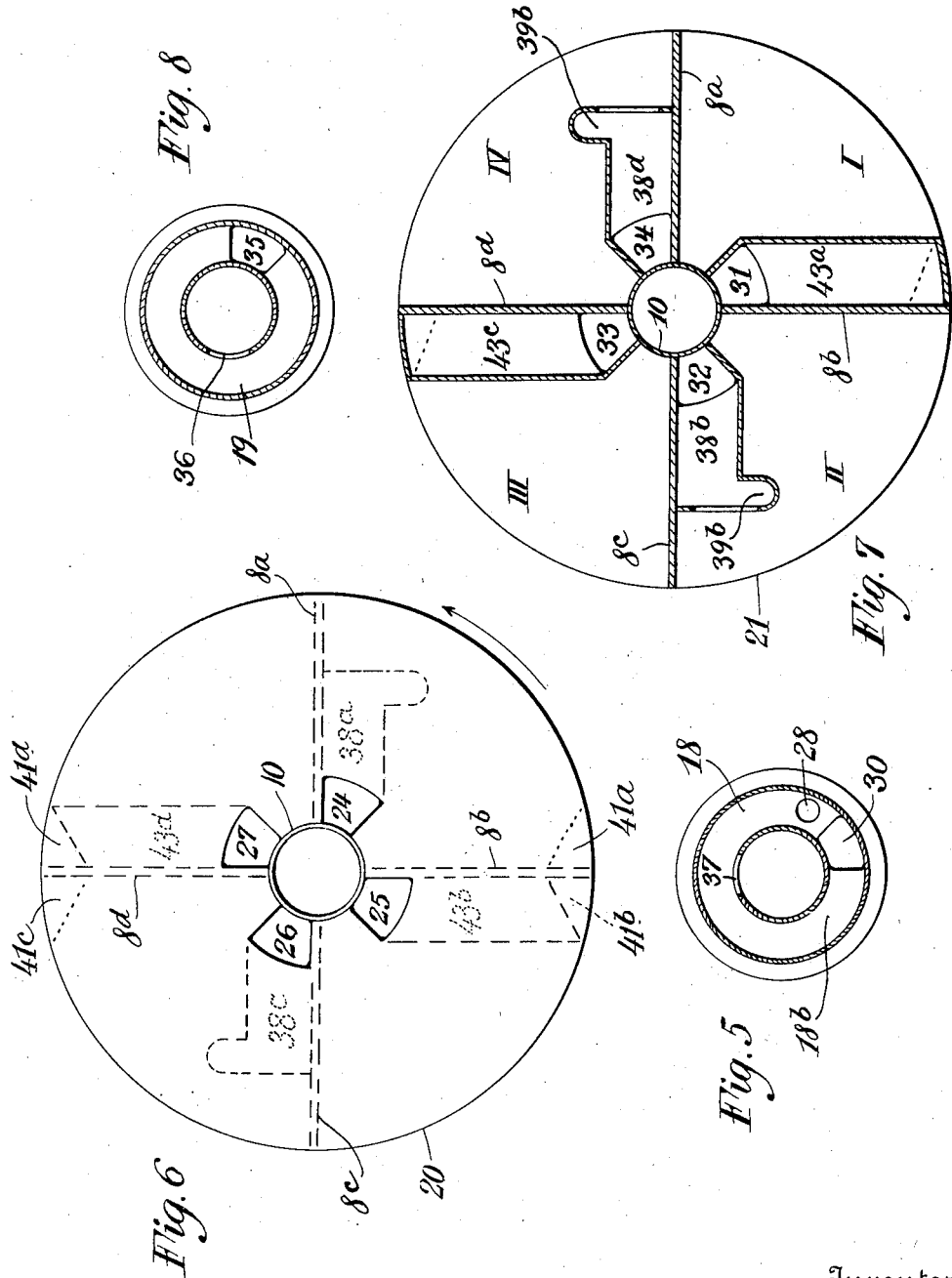

HANNS R. ANDERS, OF PERTH AMBOY, NEW JERSEY, ASSIGNOR TO THE ROESSLER & HASSLACHER CHEMICAL CO., OF NEW YORK, N. Y., A CORPORATION OF NEW YORK.

METHOD OF AND APPARATUS FOR TREATING GOODS WITH FLUIDS.

1,345,341.   Specification of Letters Patent.   Patented July 6, 1920.

Application filed December 1, 1916. Serial No. 134,481.

*To all whom it may concern:*

Be it known that I, HANNS R. ANDERS, a subject of the Emperor of Austria, residing at Perth Amboy, in the county of Middlesex and State of New Jersey, have invented certain new and useful Improvements in Methods of and Apparatus for Treating Goods with Fluids, of which the following is a specification.

This invention relates to methods and apparatus such as are suitable for use in bleaching, dyeing, washing, etc., goods, extracting goods of vegetable, animal or mineral origin with solvents and for similar purposes for treating various kinds of goods. Solid goods in either the dry or the wet state, may be treated with gases as well as liquids by my new method and in the apparatus described. Industrial gases suitable for the purpose are oxygen, ozone, sulfur dioxid, chlorin, etc. One of the objects of the invention is to provide an apparatus suitable for adjusting and mechanically regulating the course of the fluid with relation to its equal and even distribution through the goods. This and other features and advantages will be clearly understood by reference to the accompanying drawings and description wherein I have shown and described one form of apparatus suitable for carrying out my new method.

In the drawings, Figure 1 is a central vertical sectional view of one form of suitable apparatus embodying the invention, taken on line 1—1 of Fig. 2, with certain details omitted; Fig. 2 is a front end view of the apparatus; Fig. 3 is a transverse sectional view along the line 3—3 of Fig. 1; Fig. 4 is a perspective view showing the arrangement of channels and partitions within the apparatus; Fig. 5 is a front view in section of the inlet cap; Fig. 6 is a front view of the front wall of the vessel; Fig. 7 is a view, in transverse section, of the inside of the rear wall of the vessel, and Fig. 8 is a front view in section of the rear cap.

Similar numerals of reference indicate similar parts throughout the several views.

Referring to the drawings, 1 indicates a vessel, preferably cylindrical in form, made of wood, steel or other suitable material, mounted on suitable supporting rollers 2, 2 carried by bases 3. 4 indicates a flange carried by vessel 1 and passing between rollers 4ª in base 4ᵇ to restrain the vessel against lateral movement. The vessel may be rotated by means of rack 5, engaging pinion 6 on shaft 7. The nature of the fluid with which the goods are to be treated may of course be of the most varied character and as the weight of the goods also varies considerably, both factors must be taken into consideration. It is therefore sometimes necessary to use a material for vessel 1 which must be protected on the inside with a coat of paint, bakelite or other suitable material resistant to the effects of the liquor or other fluid, or to make the vessel itself of material exhibiting a similar resistance without the necessity of such interior protecting coating, as for instance of wood, soapstone, porcelain, earthenware or the like substances.

The interior of the vessel may be divided by suitable partitions $8^a$, $8^b$, $8^c$, $8^d$ into a plurality, preferably four, of equal compartments, the partitions being made of material corresponding with that of the vessel or the vessel and its interior coating as the case may be.

From the foregoing it will be noticed that the apparatus I prefer for the operation of my new method has no outside vat which would have to conform more or less with the shape of vessel 1 and which, is usually adapted to hold the fluid with which the goods, held in a drum submerged in the fluid are to be treated but that vessel 1 is not submerged and is the only container for both the goods and fluid.

Moreover the unperforated partitions and channels described below suggest, in connection with the particular function of vessel 1, that my new method of circulating the fluid and causing it to penetrate the goods is considerably different from all the processes which are carried out for instance, by means of a hollow drum within a vat, the drum holding the goods and communicating with the vat holding the fluid, by means such as for instance a great number of perforations in its walls.

For the better understanding of the process I shall describe by way of example the construction of the apparatus shown in the drawings, see Figs. 1 and 4, wherein the interior of the vessel 1 is divided into four substantially equal compartments I, II, III and IV.

Tubes 9 extending centrally through vessel 1 from end to end are inclosed within a suitable shell 10, also made of resistant material, to which shell are secured the partitions $8^a$, $8^b$, $8^c$ and $8^d$ respectively. The tubes 9 open at either end into chambers or heads 11 and 12 respectively; into chamber 11 steam may be admitted through pipe 13 for the purpose of heating the fluid, while chamber 12 acts as a collector for the water condensed from the steam. Pipe 14, entering pipe 15 of wider diameter, acts as a siphon to discharge the water from chamber 12.

The shell 16 of chamber 11 and shell 17 of chamber 12 are mounted in circular flanges $18^a$ and $19^a$ of hollow annular caps or chambers 18 and 19 respectively, which latter are pressed very tightly against the walls 20 and 21 respectively of vessel 1 by means of a set of springs 22 carried by any suitable means, the caps 18 and 19 being capable of rotary movement about shells 16 and 17 for the purpose hereinafter described.

For charging and discharging the compartments with goods, suitable manholes 23 are provided having covers $23^a$ which latter are held in place and tightened by any suitable means.

As stated, cap 18 and wall 20 of vessel 1 are pressed against each other and each of the contacting walls is provided with a certain number of openings; the wall 20 for instance, is shown as provided with four openings 24, 25, 26 and 27, (Fig. 6) located in the corners formed by the shell 10 and the inner edges of the partitions $8^a$, etc. the vessel rotating in the direction of the arrow.

The inner wall $18^b$ of cap 18, contacting with wall 20 of vessel 1, has two openings 28 and 30 as seen in Fig. 5; opening 28 being the orifice of a flexible pipe 29 connecting the vessel with a storage tank for liquids (not shown). The other opening 30 in wall $18^b$, adjoining opening 28, is located as shown, to the left side of but below said opening 28.

Within compartments I, II, III and IV of vessel 1 is provided a system of channels which regulate the course of the fluid during its passage through the compartments and consequently also through the goods to be treated.

This is illustrated in Fig. 3, which shows a front view of all the compartments as they appear with wall 20 removed. $38^a$ indicates a channel, having as entrance thereto opening 24, (see Fig. 6) the channel running along the inner side of wall 20, radially of the vessel, adjacent partition $8^a$ and in the angle formed by the line of intersection between the partition $8^a$ and wall 20. At its outer end it connects with a channel $39^a$ (see also Fig. 4) extending at right angles to channel $38^a$ and running lengthwise along the partition $8^a$ from channel $38^a$ to wall 21, said channel $39^a$ being provided with slits $40^a$ or other openings for the circulation of the fluid into compartment I. Running lengthwise along the partition $8^b$ forming the other wall of the same compartment I, adjacent the cylindrical wall of the vessel 1 and in the angle formed by the line of intersection between the outer edge of partition $8^b$ and the cylindrical wall of the vessel, there is another channel $41^a$ provided with a series of perforations $42^a$, channel $41^a$ running lengthwise of the vessel; at the opposite end thereof from channel $38^a$ and in the angle formed by the line of intersection of partition $8^b$ and the inner side of wall 21, a channel $43^a$ connects opening 31 in wall 21 of vessel 1 (see Fig. 7) with the longitudinal channel $41^a$. The channels in compartments I and III are in the same relative location and run in the same relative directions, that is to say, if for instance, partition $8^a$ is assumed to be in a horizontal position then the channels in compartment III would assume a similar relationship to those described in connection with compartment I, if after a rotation of 180 degrees compartment III comes to assume the same position. The channels in compartments II and IV have a similar relationship to those already described with regard to the channels in compartments I and III with the difference, however, that the location and direction of the channels is reversed as against the similar channels within compartments I and III. In compartment II radial channel $43^b$ along front wall 20 connects opening 25 with longitudinal channel $41^b$ running lengthwise the vessel along the line of intersection between the outer edge of partition $8^b$ and the shell of vessel 1. Said longitudinal channel $41^b$ is also provided with perforations $42^b$. Radial channel $38^b$ along the rear wall 21 of vessel 1, in the angle formed by the line of intersection of the rear edge of partition $8^c$ and wall 21, connects opening 32 in wall 21 with channel $39^b$, provided with slots $40^b$, running longitudinally along partition $8^c$ from channel $38^b$ to front wall 20. The channels in compartments II and IV are in the same relative location and run in the same relative directions. The above explanation will give a clear understanding of the arrangement of all the channels within the four compartments.

Another feature important to establish the success of my new method of and apparatus for treating goods with fluids, concerns the circulation of air from one compartment to the other while the fluid is flowing into either of them. In order that the fluid may enter the various compartments care should be taken to remove the air from the compartment to be filled.

In order to accomplish this, end pipes 44, 45, 46 and 47, (Fig. 2) are provided, a similar arrangement of pipes being preferably provided at each end of vessel 1. From Fig. 1 it is obvious that the air must escape from the highest point while the fluid flows for instance into compartment I and fills it from the bottom upwardly; the air must therefore escape through the short end 44ª of pipe 44 and thence through its long end 44ᵇ, connecting compartments I and IV with each other, while during the reversion of the vessel, when the liquor is flowing from compartment IV to compartment I the air will escape from the latter in a similar way through the like system of pipes on the other end of the vessel.

Rear wall 21 is provided with four openings 31, 32, 33 and 34, Fig. 7, said openings being located in the corners adjacent the shell 11 and partitions 8ª, etc.

The inner wall of cap 19, in contact with wall 21 is provided with but a single opening 35, (Fig. 8) which in its form is adapted to register with any of the openings 31, 32, 33 or 34 in wall 21. For the better understanding of the process it may be assumed that the upper rim of opening 35 lies horizontally at the beginning of the operation; an opening 36 is provided in the wall of shell 10 and there is a similar opening 37 through the wall of shell 10 at the other end of the vessel, so that the fluid may pass through the shell over steam heated tubes 9, as hereinafter described.

In order to provide means for regulating the flow of liquor during reverse rotation of the vessel, as hereinafter described. I may provide a frame 48, in front of the vessel, having inturned arms or flanges 50 and 51 arranged in the path of knob or projection 49 on cap 18. 52 indicates a shaft rotatably mounted in frame 48, provided with a handle 53 and carrying a hook or stop 54, adapted to be turned into and out of the path of projection 49. A similar arrangement (not shown) is provided at the other end of the vessel 1 to regulate the flow of liquor through cap 19.

I shall now describe how I may proceed to carry out a process of treating goods in the apparatus described, for example, by treating goods with a solution of a substance carrying oxygen in available form. The goods are first placed in the compartments through the manholes in the shell of vessel 1, the several compartments being preferably completely filled, and after the covers are put on tightly I rotate vessel 1 in the direction of the arrow, Figs. 4 and 6, by imparting motion to pinion 6, the knob or projection 49 being in contact with stop 54 as shown in Fig. 2.

I then admit the solution, hereafter simply called liquor, from the storage tank (not shown) into the vessel 1 through pipe 29, the liquor passing through opening 28 in the inner wall 18ᵇ of the cap 18 and through opening 24 in wall 20 of vessel 1, and thence into compartment I through channels 38ª, 39ª and slots 40ª and down through the goods through perforations 42ª into channel 41ª and thence to channel 43ª. The vessel is rotated very slowly in the direction of the arrow, cap 18 and pipe 29 remaining stationary; after a revolution of vessel 1 for 22° 30′ ($\frac{1}{16}$ rotation) opening 30, closely adjacent pipe 29 and its orifice 28 respectively, is for about ½ of its field in communication with compartment II through opening 25 in wall 20; at the other end of vessel 1, cap 19 being stationary and wall 21 rotating, opening 35 is at the same time for ½ of its field in communication with opening 31 and if the rotation continues to 45°, then openings 31 and 35 come completely into registry to permit the full flow of liquor into the cap 19 through opening 31, in communication with channel 43ª, opening 35 and thence into shell 10 through opening 36, thence through opening 37 into cap 18 and through openings 30 and 25 into compartment II. As communication with the supply tank is now cut off by wall 20 entirely covering orifice 28, it is obvious that the liquor must be discharged from compartment I into compartment II in the manner indicated.

If the rotation is continued to 90°, openings 28 and 25 come into communication with each other at the one end and at the other end opening 35 is cut off by wall 21; if now the rotation goes beyond 90°, say to 112° 30′, openings 28 and 25 are still in communication while openings 30 and 26 come into communication with each other and at the other end opening 35 comes into communication with opening 32, so that the flow of liquor passes through opening 36 and shell 10 into the compartment III by the course above described.

After a rotation of 135° plate 20 entirely cuts off the supply of liquor by covering orifice 28, the rear opening 32, however, being fully uncovered and as the rotation proceeds the liquor passes through openings 36 into the shell 10 to flow thence through openings 26 and 30 into compartment III, and so on.

In the description of the operation of the process up to now I have omitted mentioning the function performed by the various channels.

As shown in Fig. 4 the channels have a two-fold purpose, one in that they serve to regulate the flow of the fluid, and the other in that they serve to increase the surface of goods exposed to the fluid thus thinning the block of material on which the fluid may act and through which it may percolate, and it is by the effect of this and other means that the important results of my new method of and apparatus for treating goods with fluids is obtained, as my invention affords an absolute certainty that the goods, by means of the most even distribution of fluid are thoroughly wetted with the fluid, if a liquor, the percolation of the fluid through the goods being more complete than by any other method or apparatus I am aware of.

As to the regulation of the flow of the liquor in the example given, as performed by the channels, it will be seen from Figs. 3 and 4 that the liquor entering opening 24 passes through channel 38ᵃ into channel 39ᵃ to leave through slits 40ᵃ provided on one or on both sides of the same. The liquor is thus forced to pass through a considerable number of slits whereby it will distribute over and percolate most evenly through the goods, entering through openings 42ᵃ into channels 41ᵃ and 43ᵃ and passing through opening 31 into cap 19, whereupon it enters through opening 36 into shell 10, passes through the same and enters cap 18 through opening 37; the liquor passes then from cap 18 through opening 25 into channels 43ᵇ and 41ᵇ to finally pass out through slots 42ᵇ into compartment II. Remembering the description of the operation as far as the flow of the liquor is governed by the openings in the walls 20 and 21 and the caps in contact with the same, and considering, as will be further described below, how the vessel is alternately rotated in opposite directions, an inspection of Figs. 3 and 4 will show that the liquor will return in the opposite direction through the same channels into compartment I, if the rotation is reversed accordingly.

When vessel 1 is about to finish its first complete rotation and orifice 28 begins to register again with opening 24 then vessel 1 is not properly supplied with liquor as some of the liquor has been absorbed by the goods and in order to have enough of the liquor the rotation and the supply from the storage tank continues until the connection through orifice 28 is cut off again by wall 20; at this point the valve in the supply pipe 29 from the tank is closed and prevents a further supply of liquor. The quantity of liquor now taken entirely fills compartment I and is passed from the same to the next adjoining one, for instance compartment II, through openings 35 and 31, coming into registry, the liquor passing through opening 36 into channel 10 to finally flow through openings 30 and 25 into compartment II. It is seen that the liquor now in compartment II, will flow to the next adjoining one, compartment III, and so on in the manner pointed out above.

It is a particular feature of the operation of my process that the vessel does not continuously rotate in one direction but may be reversed at certain intervals dependent upon the particular circumstances of the case, the periods of reversion not necessarily being equally as long as the preceding periods, but shorter or longer as the case may require. I prefer to operate in such manner that I shorten the period of reversion 90 degrees, as compared with the preceding period, for instance if I permit the machine to make two complete revolutions I then reverse it and permit it to make only 1¾ revolutions in the reverse direction. Whenever the vessel starts to rotate in the reverse direction caps 18 and 19 follow the rotation of the vessel for an angle of 90°, that is until knob or projection 49 comes into contact with flange 50, and thus both caps have at certain intervals a sort of swinging motion similar to that of a pendulum. If the vessel reverts for a 1¾ revolution and the caps follow for an angle 90° it is easily seen that during this reverse rotation the liquor passes through the compartments in the opposite direction to that described above and that at the end of the 1¾ rotation pipe 29, or its orifice 28, is in connection with opening 26 of compartment III, whereas at the other end no communication is, or could be established as the openings through wall 21 forming entrances to cap 19 are shut from connection with compartment III.

When the operation has come to an end the liquor is withdrawn during the rotation of the vessel by opening valve 48ᵃ in connection with cap 19 and thus with shell 10, so that the liquor may run out. In doing this I let the vessel rotate alternately in the manner just described above, preferring, however, by manipulation of stop 54, to let the caps 18 and 19 follow the rotation for 90° and 180° respectively, whereby I am able to open one compartment and to bring it, by means of shell 10, in connection with valve 48ᵃ, and to shut it off, while the next following compartment enters into connection with said valve 48ᵃ, so that the liquor is discharged from one compartment while that part of the liquor retained in the goods may run off during the further reversed rotation and accumulate at the lowest point to be also discharged as soon as the rotation is reversed again.

Assuming that at the end of the operation opening 24 registers again with orifice 28 of pipe 29 and that opening 31 is fully shut off by wall 21, and that this compartment contains all the liquor, then the operation of discharging the liquor from the vessel is started by reversing the vessel and it is seen that during the rotation for the first 90° no liquor may leave compartment I, but during the rotation for the second 90° there will obviously be a moment when opening 30 and opening 24 register while openings 31 and 35 are in their original position. At this moment the liquor discharges from compartment I through openings 30 and 37 into channel 10 to flow through it into cap 19 and to leave through valve 48ª. At the end of this rotation of 180° compartment I is now empty as far as the liquor is concerned, which may freely run out; but it is also seen that this compartment is now completely shut off from the circulation of the liquor and therefore that part of the liquor which is still retained in the goods, drains off and is discharged as soon as the rotation brings compartment I again in connection with valve 48ª. All the other compartments are emptied in the manner I have described with reference to compartment I and this statement is not influenced by the fact that after the main part of the freely flowing liquor has run out, the rotation of the vessel is reversed at will to facilitate draining off the liquor retained by the goods.

The operation of treating goods with liquids almost always requires a subsequent washing of the goods with water and in regard to this operation I would state that it may be performed in the same way as described for the liquor, the water, being admitted through pipe 29 into the compartment I and from there into all the other compartments so that the vessel is pretty nearly completely filled, only a little air remaining in the vessel as otherwise the circulation of the washing water would be almost stopped. To permit the admission of water into the vessel a branch pipe (not shown) for water is connected with pipe 29 and the flow of either liquor or water is regulated by suitable valves.

In the description of the apparatus and the process and in the claims, where I use the word "fluid" I mean to include under this term not only liquids but gases as well. I do not restrict myself to the details of either the process or the apparatus, further than the scope of the appended claims demands, as is is obvious that the same may be greatly varied without departing from the spirit of the invention.

I claim:

1. The method of treating goods with fluids, consisting in packing the goods in separate compartments within a rotary vessel, introducing the fluid into one compartment and thence circulating it to another compartment and causing it to percolate through the goods in the several compartments.

2. The method of treating goods with fluids, consisting in packing the goods in separate compartments within a rotary vessel, removing the air from the compartments to be packed, and introducing the fluid into one compartment and thence circulating it to another compartment and causing it to percolate through the goods in the several compartments.

3. The method of treating goods with fluids, consisting in packing the goods in separate compartments within a vessel, introducing the fluid into a compartment and discharging it against the goods in a plurality of streams extending throughout the entire length of the vessel, rotating the vessel on its longitudinal axis during such discharge, and circulating the fluid from one compartment to another in succession.

4. The method of treating goods with fluids, consisting in packing the goods in separate compartments within a vessel, introducing the fluid into a compartment and discharging it against the goods in a plurality of streams extending throughout the entire length of the vessel, rotating the vessel on its longitudinal axis during such discharge, and circulating the fluid from one compartment to another in succession in the direction of the length of the vessel.

5. The method of treating goods with fluids consisting in packing the interior of a vessel with goods, subdividing the goods in the vessel in separate compartments thereof, spreading the goods over channels extending throughout the compartments, introducing a fluid into said vessel, discharging said fluid into the compartments in a plurality of small streams and rotating the vessel during said discharge first in one direction and then in the other.

6. The method of treating goods with fluids consisting in packing the interior of a vessel with goods, subdividing the goods in the vessel in separate compartments, circulating a fluid from one compartment to another and discharging the same into the respective compartments in a plurality of small streams, rotating the vessel during said discharge and at intervals reversing the rotation for a predetermined portion of a revolution.

7. An apparatus for treating goods with fluids comprising a container capable of being rotated, partitions dividing the inside of the container into a plurality of chambers, means for communication between the chambers, and longitudinal channels within the chambers having connection with said communication means and provided with a plurality of openings discharging it into said chambers.

8. An apparatus for treating goods with fluids comprising a container capable of being rotated, partitions dividing the inside of the container into a plurality of chambers, means for communication between the chambers, and a plurality of longitudinal channels within each of said chambers adjacent said partitions, one on each side of each partition, in connection with said communication means and each channel provided with a plurality of openings connecting it with its respective chamber.

9. An apparatus for treating goods with fluids comprising a container capable of being rotated, partitions dividing the inside of the container into a plurality of chambers, a central longitudinal chamber, an annular chamber at each end of said last named chamber in communication with it and longitudinal channels in the chambers formed by the partitions in communication with said annular chambers and provided with a plurality of openings discharging into said chambers formed by the partitions.

10. An apparatus for treating goods with fluids comprising a container capable of being rotated, partitions dividing the inside of the container into a plurality of chambers, means for communication between the chambers during rotation in either direction, longitudinal channels within the chambers having connection with said communication means and provided with a plurality of openings discharging into said chambers, means for rotating said container in either direction and means for predetermining the extent of rotation in one direction.

In testimony whereof I have signed this specification.

HANNS R. ANDERS.